(12) United States Patent
Balaven et al.

(10) Patent No.: US 7,047,165 B2
(45) Date of Patent: May 16, 2006

(54) METHOD OF GENERATING A GRID ON A HETEROGENOUS FORMATION CROSSED BY ONE OR MORE GEOMETRIC DISCONTINUITIES IN ORDER TO CARRY OUT SIMULATIONS

(75) Inventors: Sophie Balaven, Massy (FR); Jean-Daniel Boissonnat, Mouans Sartoux (FR); Chakib Bennis, Rueil-Malmaison (FR); Sylvain Sarda, Rueil-Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 908 days.

(21) Appl. No.: 09/727,452

(22) Filed: Dec. 4, 2000

(65) Prior Publication Data

US 2002/0038201 A1     Mar. 28, 2002

(30) Foreign Application Priority Data

Dec. 10, 1999   (FR) .................................. 99 15713

(51) Int. Cl.
*G06F 9/455*   (2006.01)
(52) U.S. Cl. ......................................................... 703/2
(58) Field of Classification Search ..................... 703/2
See application file for complete search history.

(56) References Cited

U.S. PATENT DOCUMENTS 5,886,702 A  *  3/1999  Migdal et al. ............... 345/423
6,330,523 B1 * 12/2001  Kacyra et al. ............... 702/159
6,678,642 B1 *  1/2004  Budge .......................... 703/2

FOREIGN PATENT DOCUMENTS

GB            2322702        9/1999

WO            9957418        11/1999

OTHER PUBLICATIONS

Marc Soucy et al, "A General Surface Approach to the Integration of a Set of Range Views", IEEE Transactions on Pattern Analysis and Machine Intelligence, U.S., IEEE Inc., New York, vol. 17, No. 4, Apr. 1, 1995, pp. 344-358, XP000499566, ISSN: 0162-8828.
F. Aurenhammer, "Power diagrams: Properties, Algorithms and Applications", Siam Journal of Computing, Feb. 1987, USA, vol. 16, No. 1, pp. 78-96, XP000900943, ISSN: 0097-5397.

* cited by examiner

(Continued)

Primary Examiner—Anthony Knight
Assistant Examiner—Michael B. Holmes
(74) Attorney, Agent, or Firm—Antonelli, Terry, Stout and Kraus, LLP.

(57) ABSTRACT

A method of generating a hybrid grid of a heterogeneous formation crossed by one or more geometric discontinuities such as, for example, an underground formation where one or more wells have been drilled, or a fractured formation, by combining structured grids and non-structured grids in order to carry out simulations in accordance with a defined numerical pattern is disclosed. Hybrid gridding is performed by associating a first structured grid (G1) for gridding of the heterogeneous medium considering discontinuities thereof with second structured, radial type grids (G2) for gridding of a zone around each pipe or well, which allows better consideration of constraints linked with flows in the zone. In order to connect the first grid of the medium and the second well grids, non-structured transition grids (G3) are interposed there between. A power diagram technique is used, which is particularly advantageous in that it allows appropriate connection of non-regular structured grids. An application is hydrocarbon reservoir simulation.

20 Claims, 5 Drawing Sheets

METHOD OF GENERATING A GRID ON A HETEROGENOUS FORMATION CROSSED BY ONE OR MORE GEOMETRIC DISCONTINUITIES IN ORDER TO CARRY OUT SIMULATIONS

BACKGROUND OF THE INVENTION

1. Field of the Invention

The present invention relates to a method of generating a hybrid grid of a heterogeneous formation crossed by one or more geometric discontinuities in order for example to carry out simulations.

The method is more particularly applied to formation of a grid suited to an underground reservoir crossed by one or more wells, or by fractures or faults, in order to model displacements of fluids such as hydrocarbons.

2. Description of the Prior Art

Grid generation is a crucial element for the new generation of reservoir simulators. Grids allow to describe the geometry of the geologic structure studied by means of a representation in discrete elements wherein simulation is performed according to a suitable numerical pattern. Better comprehension of physical phenomena requires 3D simulation of the multiphase flows in increasingly complex geologic structures, in the vicinity of several types of singularities such as stratifications, faults, pinchouts, channels and complex wells. All this complexity has to be taken into account first by the grid which has to reproduce as accurately as possible the geologic information in its heterogeneous nature.

Grid modelling has made great advances during the past few years in other fields such as aeronautics, combustion in engines, structure mechanics, etc. However, the gridding techniques used in the other fields cannot be applied to petroleum applications because the professional constraints are not the same. For example, in reservoir simulation, the numerical patterns are constructed from control volumes in order to better respect the mass conservation in the case of transport equations of hyperbolic nature. The grid must be a "block-centered" type grid, that is the nodes must be inside each layer and the boundaries of each block must follow the interface between the layers. Now, if this constraint was not taken into account, the nodes would naturally be placed along the faults and along the stratification boundaries. The consequence of this would be that these interfaces would pass through the control volume used. The saturation, constant in the control volume, could not consider discontinuities and the results would not be accurate. It is therefore necessary to develop new techniques that are better suited to petroleum application requirements.

Cartesian grids, which are commonly used in current commercial simulators, are unsuited for solving these new problems posed by the development of petroleum reservoirs. Cartesian grids, based on parallelepipedic elements, do not allow representation of such complex geometries.

There is a well-known method of generating structured 3D hexahedral grids of CPG (Corner-Point-Geometry) type which respects the geometry of the bodies. It is described in French patent 2,747,490 U.S. Pat. No. 5,844,564) filed by the assignee and also in the following publication:

Bennis Ch. Et al. "One More Step in Gocad Stratigraphic Grid Generation: Taking into Account Faults and Pinchouts"; SPE 35526, Stavanger, 1996.

This grid type is more flexible than cartesian grids because it consists of any hexahedral elements that can be degenerated. It strictly considers the horizons, the faults and it allows representation of certain unconformities such as pinchouts because its construction is based on these elements. However, this type of grid does not allow solution of all geometric complexities such as, for example, circular radial grids around complex wells. It is possible to form separately the grid of the reservoir and the grids around the wells but it is difficult to represent several objects in the same CPG type reservoir grid because of connection problems linked with the structured nature of the grid.

Another approach is also known where 3D grids are only based on tetrahedral Delaunay elements, with a circular radial refinement around the wells, being automatically generated. The advantage of such an approach is that it is entirely automatic and does not practically require the user's attention. However, this method has drawbacks which make the results obtained difficult to use:

there are on average five times as many grid cells as in a CPG type grid for the same structure, which is very disadvantageous for simulation calculations, unlike the structured grids which are easy to display, to explore from the inside and to locally modify interactively, it is very difficult and sometimes impossible to properly control the tetrahedral grids because of their size and especially because of their non-structured nature. This poses problems for validating the grid from a geometric point of view as well as for understanding and validating the result of a simulation on this type of grid.

Other approaches are also well-known, which allow generation of grids, notably grids based on control volumes generated from a triangulation associated with techniques of aggregation of the triangles (or tetrahedrons) into quadrangles allowing the number of grid cells to be reduced. Although promising results were obtained with these new grids, precise representation of the geologic complexity of reservoirs and wells remains a subject for research and development. Despite their hybrid nature, they remain entirely unstructured and would therefore be very difficult to manage and to handle in real 3D. Furthermore, taking account of real 3D faults and deviated wells would greatly increase this difficulty.

French patent application 99/15,120, filed by the assignee, describes a method of generating a 3D hybrid grid on a heterogeneous medium, comprising using a first structured grid, of CPG type for example, and structured radial grids around well or pipe trajectories drawn or imported into the model in order to better take into account the particular constraints linked with the flows in the vicinity of these wells. These grids are combined by including the radial grids around around each well in the global reservoir grid after forming therein cavities that are large enough to allow formation of unstructured transition grids.

There are various well-known techniques for forming unstructured grids. These techniques can be based on canonical polyhedrons (tetrahedrons, pentahedrons, pyramids, etc.) according to the numerical pattern being used, and entirely 3D solutions applicable to these grid types are known.

The method according to the invention is intended for 2.5D generation of transition grids based on Voronoi type or similar polyhedrons in order to apply control volume type numerical patterns, which are reduced to a 2D problem provided that all the layers of the well grids and of the reservoir grid can be projected vertically in a horizontal plane so as to form identical grid cells.

Such a grid must meet certain conditions:

the segment connecting the centers or sites of two neighboring cells must be orthogonal to the side common to the two cells, two neighboring cells must entirely share the side that connects them, that is a cell can 5 be connected to only one other cell by the same side, and the cells must be convex.

In 2D, these constraints impose that:

the edges of the boundary polygons must not be modified (each one must correspond to an edge of a cell created, without subdivision of the edge), and the cells which are created must be convex, each cell must have a center such that the straight line connecting the centers of two adjacent cells is perpendicular to the edge shared by the two cells, and the centers of the cells must be inside their cell.

Other entirely non-structured approaches are also well-known, which allow generation of grids, notably grids based on control volumes generated from a triangulation, associated with techniques of aggregation of the triangles (or tetrahedrons) into regular quadrangles allowing the number of grid cells to be reduced.

Voronoi diagrams are formed, as it is well-known, by determining around a set of sites P distributed in a space regions consisting of series of points which are closer to each site than to any other site P of the set. This construction technique is described in detail notably in the following documents:

Aurenhammer F., 1991: Voronoi "Diagrams: A Survey of Fundamental Geometric Data Structure," ACM Comput. Sun., 23, 345–405, Fortune S., 1992: Voronoi Diagrams and Delaunay Triangulations, pages 225–265 of D. Z. Du & F. K. Hwang (eds), Computing in Euclidean Geometry, 2nd edn., Lecture Notes Series on Computing, vol. 4, Singapore, World Scientific.

Figure 6:
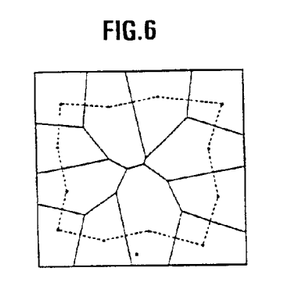
FIG. 6 shows an example of a Voronoi diagram which disregards geometric constraints.

The cells of a Voronoi diagram meet the following constraints: the orthogonality between the centers and the adjacent edge is respected and the cells are convex. It is therefore natural to propose filling the cavity with Voronoi cells while trying to consider the edge geometric constraints. However, if a Voronoi diagram is created from the existing points (ends of the polygon edges) (see FIG. 6), it can be observed that this diagram does not meet the geometric constraints, that the polygon edges do not belong to the diagram and that the edges are cut.

Figure 7:
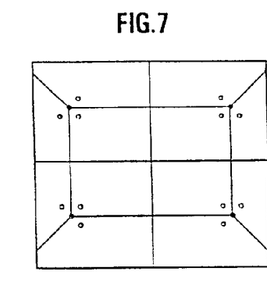
FIG. 7 shows an example of a Voronoi diagram whose edges are divided.

In order to introduce the edges of the boundary polygons, it is possible to duplicate the existing points. The Voronoi diagram thus has to pass through the edges. However, this is not yet sufficient because, although the edges are in the diagram, they still are divided (see FIG. 7).

Figure 8A:
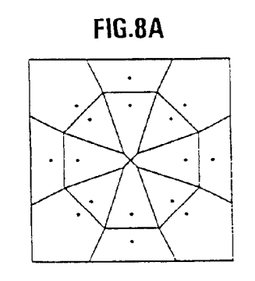
FIGS. 8A, 8B show examples of Voronoi diagrams in a regular case with any case with conflict respectively.
Figure 8B:
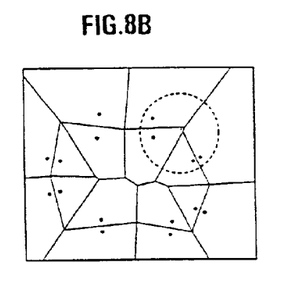

Since the edges of the Voronoi diagram correspond to the mid-perpendiculars of the segments defined by two sites, passing through these mid-perpendiculars through the ends of the edges defined by the polygons can be tried. For a given end point, the sites of the Voronoi diagram are therefore selected along edges adjacent to this point, equidistant therefrom. Since the points are duplicated, one can be certain to obtain an edge of the Voronoi diagram on the edge of the polygon. However, if the result obtained is correct in the case of a regular polygon (FIG. 8a), this is not the case for a non-regular polygon (FIG. 8b). When the last sites are placed, they are not necessarily at the same distance from the point as the first placed sites.

Generally speaking, using Voronoi cells for filling the cavity does therefore not seem to be suitable.

SUMMARY OF THE INVENTION

The method according to the invention simplifies the formation of a hybrid grid suited to a heterogeneous medium crossed by at least one geometric discontinuity of known geometry, in order to form a model representative of fluid flows in a formation of the medium in accordance with a defined numerical pattern, the structure of the medium being known a priori from available data acquired by means of in-situ measurements, analyses and/or interpretations of images of the medium (seismic images for example, in the case of a reservoir).

The method comprises forming at least a first structured grid (irregular CPG type grid for example) for gridding of at least part of the medium, forming at least a second structured grid for gridding of another part of the medium, forming at least one cavity between the structured grids including each geometric discontinuity and of sufficient size allowing forming at least one non-structured grid providing transition between the structured grids, and forming each non-structured transition grid by means of power diagrams and by imposing conformity of the transition grids with the grid of the walls of each cavity.

The method is for example applied to a heterogeneous medium where at least one geometric discontinuity is a pipe or a well of known geometry crossing the medium, in which case a first structured grid is formed in the medium by considering the discontinuities thereof, a second structured, radial type grid is formed around each well, each cavity being defined around each second structured radial grid by deactivating grid cells of each first structured grid.

The method is also applied for example to a heterogeneous medium where at least one geometric discontinuity is a fracture or a fault crossing the medium, in which case a first structured grid and a second structured grid are formed in parts of the heterogeneous medium, on either side of each fracture, while considering the discontinuities thereof, each cavity formed in order to include a non-structured transition grid therein being formed by deactivating grid cells of the first and second structured grids, on either side of each fault or fracture.

Use of the power diagram technique is particularly advantageous and convenient in that it allows appropriate connection of the non-regular structured grids.

The invention also relates to a method of simulating, in accordance with a defined numerical pattern, the evolution of a process such as fluid flows in a heterogeneous medium crossed by at least one geometric discontinuity of known geometry, in accordance with a defined numerical pattern, the structure of the medium being known a priori from available data acquired by means of in-situ measurements, analyses and/or interpretations of images of the medium. This simulation is obtained by forming a hybrid grid consisting of at least a first structured grid (irregular CPG type grid for example) for gridding of at least part of the medium, at least a second structured grid for gridding of another part of the medium, at least one cavity between the structured grids including each geometric discontinuity and of sufficient size to allow formation of at least one unstructured grid providing transition between the structured grids, by using power diagrams and by imposing conformity of transition grids with a grid of walls of the cavities, and by solving the numerical pattern in the grid made on the medium for simulating the process.

The global hybrid grid is thus obtained by combination of several grid types: a structured reservoir grid, a radial grid around each well, also structured, and unstructured transition grids which connect the previous two grid types. Each one of these grids has its own formation methods.

Using a reservoir simulator of a well-known type, such as ATHOS™ or SCORE™ for example, for a reservoir provided with a hybrid grid obtained by means of the method, allows production simulations to be performed.

BRIEF DESCRIPTION OF THE DRAWINGS

Other features and advantages of the method according to the invention will be clear from reading the description hereafter of non limitative examples, with reference to the accompanying drawings wherein.

DETAILED DESCRIPTION OF THE INVENTION

Generation of the hybrid reservoir grid is carried out in stages with addition/subtraction of elementary grids of different types.

1) In order to represent the reservoir as a whole, an i, j, k structured grid of a known type, referred to as CPG, as described in the aforementioned French patent 2,747,490 filed by the assignee, is for example used.

The reservoir can be faulted with downcreep of a block in relation to the other. The major horizons and faults are first modelled by continuous surfaces from data resulting from an interpretation of seismic images of the subsoil or from data obtained during drilling (well markers). The geologic structure is then divided into faulted blocks resting on these surfaces. These blocks are individually gridded and then reassembled. Gridding of a block first consists in gridding the edge surfaces, then the inside is populated by transfmite interpolation of the edge surface grids. Relaxation techniques are then applied to the edge surfaces and to the inside so as to harmonize and to regulate the grid. The grid thus obtained strictly considers the horizons, the faults and it allows representation of unconformities such as pinchouts. It meets all the constraints of geologic nature.

Such a grid is obtained for example in accordance with the method described in the aforementioned French patent 2,747,490.

2) The well trajectories are drawn synthetically or imported. A structured radial grid is then generated around each well in order to take account of the particular constraints linked with the flows in the vicinity of the wells.

Figure 1:
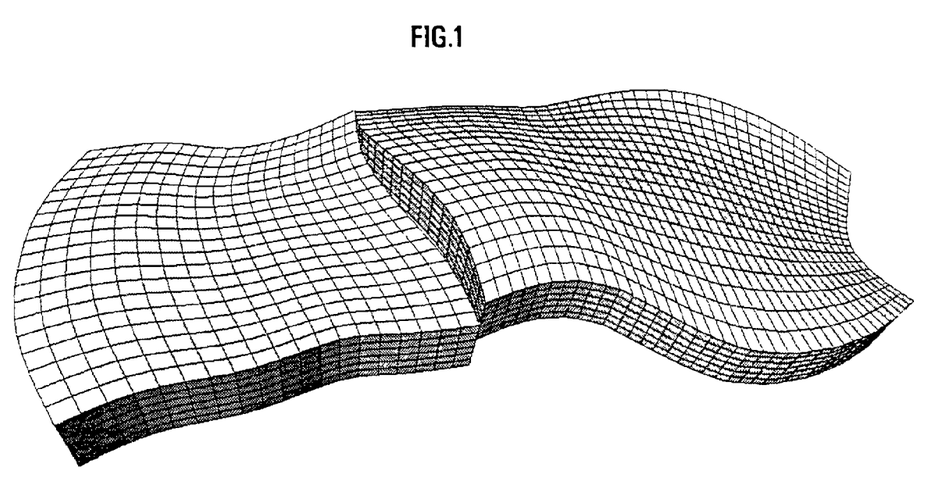
FIG. 1 shows an example of a structured grid of a faulted reservoir.
Figure 2:
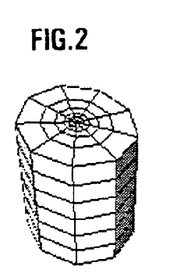
FIG. 2 shows an example of a radial grid around a vertical well.

In the example shown in FIG. 2, the structured grid around a vertical well is of circular radial type. It is also a CPG type grid. Its generation first consists in sampling a disc at r, $\theta$ in the horizontal plane. The 2D grid thus obtained is then projected vertically upon the various layers of the reservoir grid. Here, the i, j, k of the matrical structure correspond to the samplings at r, $\theta$ and z respectively (see FIG. 11).

Figure 3:
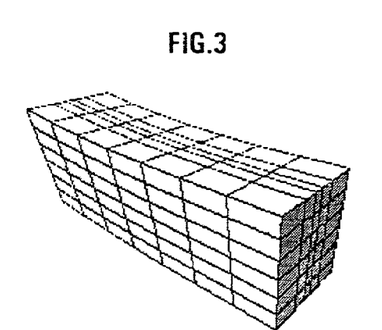
FIG. 3 shows an example of grid of a horizontal well.

The grid around a horizontal well (FIG. 3) is i, j, k structured, it is of the same type as that of the reservoir, except that a well cannot be faulted. It is also obtained by projecting vertically upon the various layers of the reservoir grid a 2D grid belonging to a horizontal plane.

Figure 4:
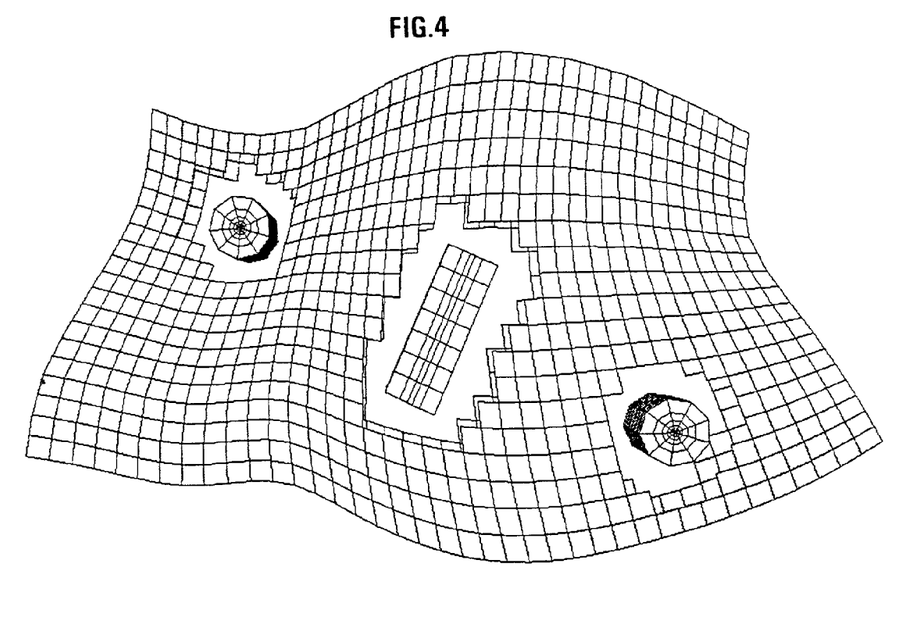
FIG. 4 shows, in 2.5D, an example of a gridded reservoir where cavities are provided for gridded wells, before creation of non-structured interstitial grids intended to connect the wells together.
Figure 5:
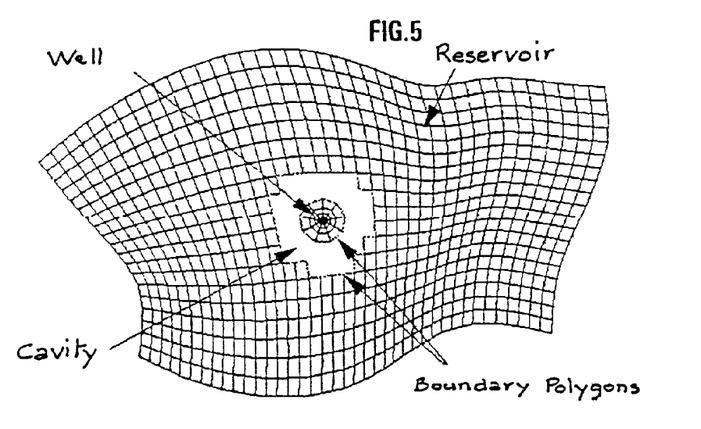
FIG. 5 shows an example of a 2D grid before creation of the transition grid.

3) This radial grid is then inserted around the or around each well in the global reservoir grid. A cavity is therefore first created in the reservoir grid by deactivating all the grid cells in contact with well grid cells (FIGS. 4, 5). The space freed between the reservoir grid and the well grid must be sufficient to allow convenient formation of a transition grid. It can represent for example about the equivalent of two grid cell layers.

4) A non-structured transition grid is then generated in this cavity (FIGS. 16, 17) in order to connect the structured radial grid around the well to that of the reservoir best respecting the constraints linked with the numerical pattern. The user can deactivate the grid of a well any time by reactivating the grid cells of the corresponding cavity in the reservoir grid.

Generation of the transition grid uses a technique known in the art, which is for example described by:

Aurenhammer F., 1987: Power Diagrams: Properties, Algorithms and Applications; SIAM J. Comput., 16(1), 78–96, some notions of which are discussed hereafter to clarify the description.

Weighted Point

Let p be a point of $\mathfrak{R}^3$ with which a weight w is associated. The pair (p,w) thus 20 formed is denoted by p and referred to as weighted point. A weighted point can also be interpreted as a circle C of centre p and of radius $\sqrt{w}$.

Notion of Power

Figure 9:
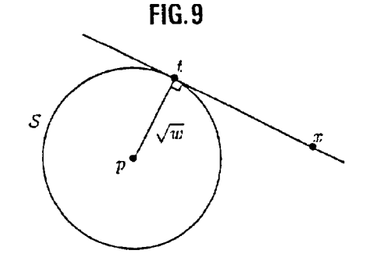
FIGS. 9 to 14 illustrate the definitions and properties of the power diagrams; discussed hereafter.

The power of a point x in relation to weighted point p or to circle C is denoted by $Power_{(p,x)} = Power_{(S,x)} = |px|^2 - w.|px|^2$ represents here the Euclidean distance between p and x. Geometrically, if x is outside the circle and if t is the intersection point of a tangent to C passing through x, $Power^{(S,x)} = |xt|^2$ (see FIG. 9).

Power of a Point in Relation to a Circle

Let C be a circle of center c and of radius r, of equation:

$$C(x)=0 \text{ where } C(x) xc^2-r.$$

C(x) is the power of point x in relation to C.

Power Diagram

Let S be a set of weighted points. Each point p of S is associated with a region R(pp), potentially empty, defined by:

$$R(\rho)=\{x\in\Re^3/\text{Power}_{(p,x)}<\text{Power}_{(pi,x)}, \rho i\in S-\{p\}\}$$

This set of regions or cells is called power diagram of S.

Radical Axis of Two Circles

Figure 10:
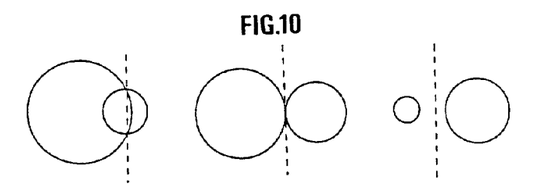

The radical axis of two circles is the line formed by the points having the same power in relation to the two circles. In particular, if the two circles have an intersection that is not equal to zero, the radical axis is the line passing through the intersection (FIG. 10).

Use of the Power Diagrams

Power diagrams lend themselves well to solution of the problem posed because they afford the advantage of having the following properties: the cells that constitute them are convex, each cell has a center (site) and the line connecting the centers of two adjacent cells is perpendicular to the edge common to the two cells, properties which thus satisfy part of the conditions laid down.

Furthermore, it is advisable that the cells of the power diagram respect the edges of 5 the boundary polygons. The edges of the polygons therefore have to be edges of the power diagram. The constraint imposed for such a diagram is that the edges of the polygons have to be the edges of a Delaunay triangulation commonly used in the field of grids. This requirement is readily met because the boundary polygons are determined as the cavity is created. Once this condition established, it is possible, as explained hereafter, to create a power diagram meeting the constraints.

Figure 11:
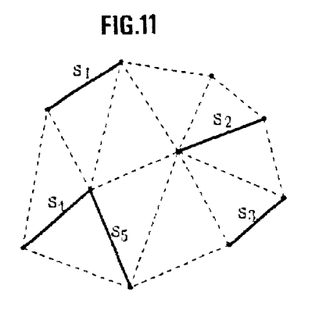

Constrained power diagram: accordance with the given edges Let (5) be a set of n edges in the plane belonging to a Delaunay triangulation (Td) (see FIG. 11).

Figure 12:
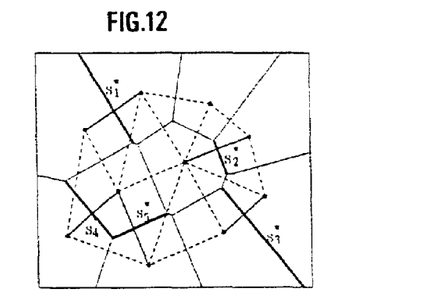

Let (S*) be all the dual edges of (5) in the Voronoi diagram associated with (Td) 15 (see FIG. 12).

Figure 13:
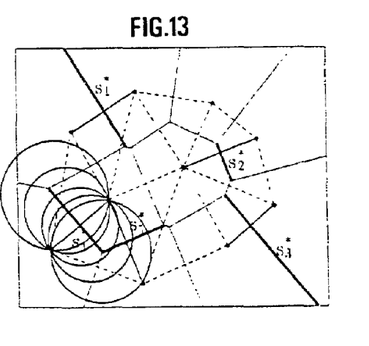

Let $a_i$ and $b_i$, i=1 ... n, be the ends of edge $S_i$. Consider its dual edge $S_i^*$ in the Voronoi diagram associated with $(T_d)$. It defines a set of circles $(C_i)$ of centers $c_i$, taken on $S_i^*$ and of radius $\|c_i a_i\|=\|c_i b_i\|$. Any circle $C_i$ of $(C_i)$ therefore comprises $a_i$ and $b_i$, and it is an empty circle (FIG. 13). Consider $C_i^1$ and $C_i^2$ two circles of $(C_i)$. According to all 20 that has been written above, $a_i$ and $b_i$ are on $C_i^1$ and $C_i^2$. $a_i$ and $b_i$ are thus the intersection points of C1 and $C_i^2$ and they are located on their radical axis. In terms of power, it can be written in the form:

$$C_i^1(a_i)=C_i^2(a_i)=C_i^1(b_i)=C_i^2(b_i)=0$$

By construction, whatever $C_j$ of $(C_j)$, j=1 ... n, j≠i, the inside of $C_j$ is empty and therefore contains neither $a_i$, nor $b_i$. It is thus possible to write:

$$\forall j, C_j(a_i) \geq 0$$

$$\forall j, C_j(b_i) \geq 0.$$

Figure 14:
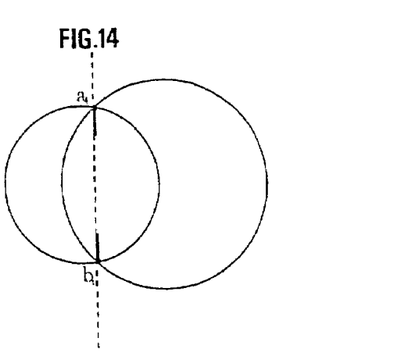
Figure 15:
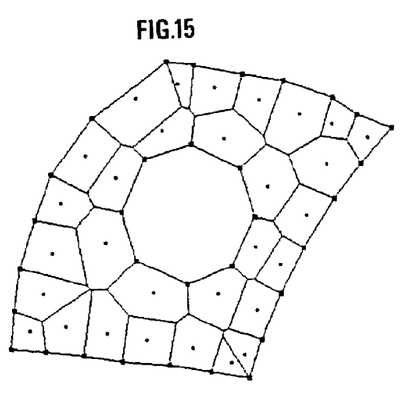
FIG. 15 shows an example of a power diagram obtained between two polygons.

$a_i$ therefore belongs to an edge of the power diagram borne by the radical axis of $C_i^1$ and of $C_i^2$, $b_i$ belongs to an edge of the power diagram borne by the radical axis of $C_i^1$ and of $C_i^2$ (FIG. 14).

Since, by definition, the cells of a power diagram are convex, it is deduced therefrom that segment $\{a_i, b_i\}$=Si belongs to the power diagram.

This is true for any $S_i$ of (S). A constrained power diagram containing all the segments of (S) can thus be constructed.

The degree of freedom for constructing such a diagram is great because the only constraint consists in selecting two centers per dual edge $S_i^*$ for any $S_i$ of (S).

It can be noted that, if $S_i^*$ is reduced to a point, all of $(C_i)$ is reduced to a circle of center $c_i=S_i^*$. A virtual center $c_{iv}$, infinitely close to the first one, therefore has to be used in such a case in order to define a second circle.

Construction of the Transition Grid by Means of the Power Diagrams

Creation of a power diagram, transition grid, starts with the construction of a Delaunay triangulation of the vertex ends of the edges of the boundary polygons. It has to be checked that all the initial edges really are edges of the triangulation obtained. The Voronoi diagram associated with the vertices of the polygons is then constructed. This Voronoi diagram defines, for each edge A of the polygons, a dual edge A'.

Figure 16:
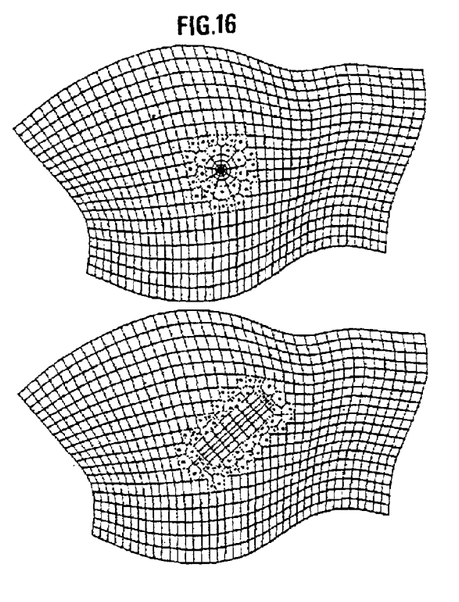
FIG. 16 shows an example of a 2D interstitial grid formed by means of the method according the invention, between a structured reservoir grid and structured grids formed around a vertical and horizontal well crossing the reservoir.
Figure 17:
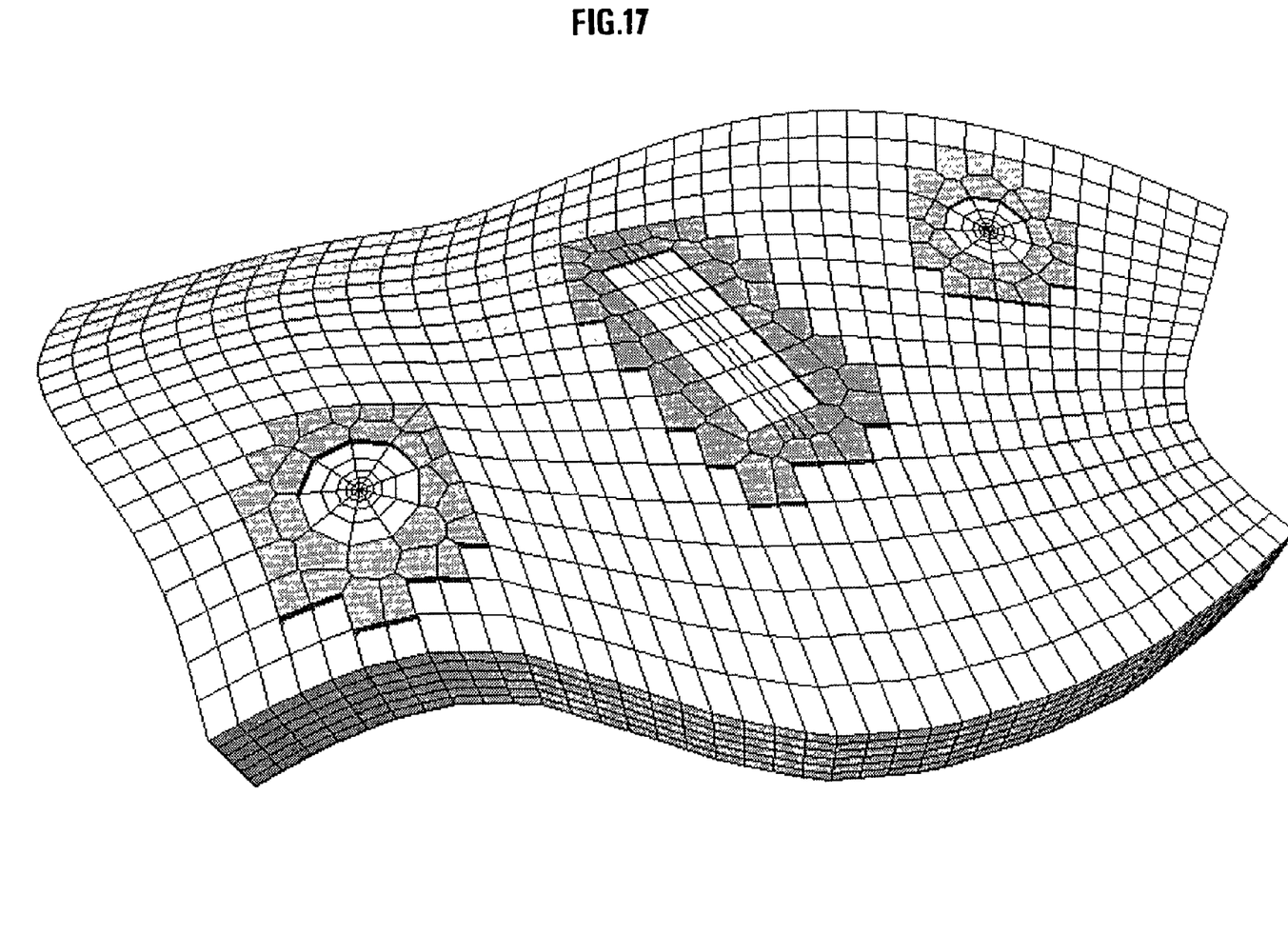
FIG. 17 shows an example of a global grid obtained with the method.
Figure 18:
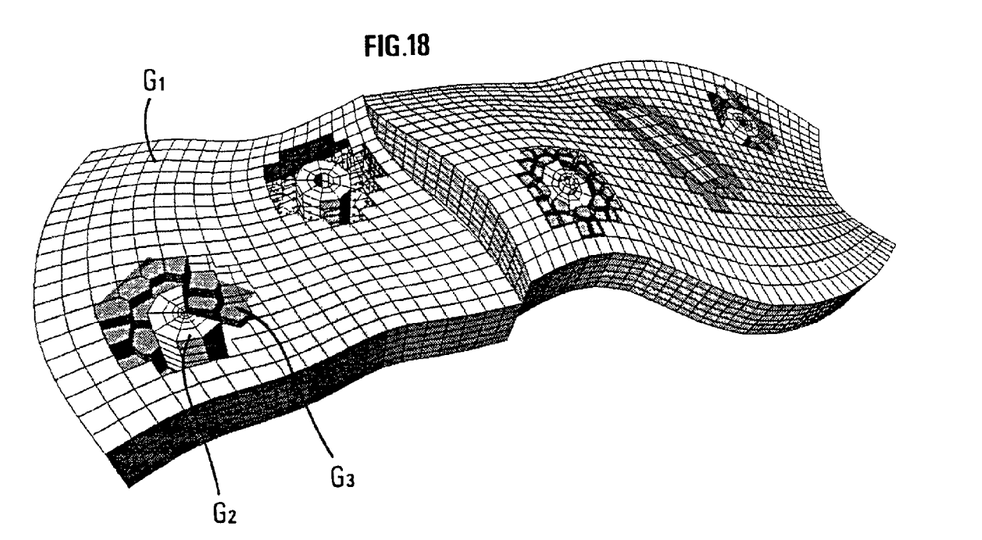
FIG. 18 shows five wells each provided with a radial grid, included in a gridded 15 reservoir, by means of unstructured transition grids based on any polyhedral grid cells.

Then, for each edge A, two sites of the final power diagram are positioned on A'. Since the sites must be weighted points, a weight equivalent to distance $\|ax\|^2$ where a is an end of A is associated with site x located on A'. The power diagram obtained from these sites then respects the edges of the polygons. FIG. 16 is an example of a power diagram obtained between two polygons with a single site per edge.

Once this diagram obtained, all the initial constraints are now met, even if it has to be checked that each site is inside its cell. By construction, the sites are positioned on the dual edges without specifying in which way. It has so far been shown that a correct power diagram is available from the moment that the sites are selected on A', but the possibilities of selection of these sites are multiple. It is however possible to guarantee that, if any edge A intersects its dual edge A', there is at least one power diagram considering the boundary polygons and whose sites are inside their cell.

Results

FIG. 16 shows two examples of 2D grids. The first example corresponds to a vertical well situation, whereas the second one shows the case of a horizontal well. It can be seen in these examples that the cells generated for connection of the well and reservoir grids meet the constraints stated in the problem: the cells are convex, the sites are inside their cell, the edges of the polygons (grid edges) are considered and the line connecting the sites of two adjacent cells is perpendicular to the edge common to the two cells.

The 2D stage first allows generation of the transition grids and thus to connect the well grids with the reservoir grid. In order to obtain volume grids, the initial grids are converted to 2D grids and a reverse treatment is applied to the 2D results, which allows obtaining a final global 2.5D grid.

The case where the second structured grids are radial type grids formed around wells crossing the medium, with defining cavities around each second grid in order to include a transition grid, has been considered. It is however clear that the method is applied for gridding of a medium with other types of geometric discontinuities, such as for example an underground reservoir crossed by fissures. In such a case, structured grids are formed in parts of the medium on either side of the fissures, and cavities are defined by deactivating grid cells of the two structured grids around each fissure, large enough to form non-structured transition grids therein by means of power diagrams and by imposing conformity of the transition grids with the grid of the walls of each cavity.

The invention claimed is:

1. A computer implemented method of generating a hybrid grid applicable to a heterogeneous reservoir crossed by at least one geometric discontinuity of known geometry, in order to form a model representative of fluid flows in the reservoir in accordance with a defined numerical pattern, a structure of the reservoir being known a priori from available data acquired through in-situ measurements, analyses and/or interpretations of seismic images of the reservoir, comprising:

forming at least one first structured grid for gridding of at least one part of the reservoir;

forming at least one second structured grid for gridding of another part of the reservoir comprising the discontinuity;

forming at least one cavity between the at least one first structured grid and each of the at least one second structured grid with a sufficient size to allow formation of at least one unstructured grid providing transition between the structured grids;

forming each unstructured grid which provides transition by use of a power diagram and by imposing conformity of each unstructured grid providing the transition with walls of each cavity; and generating the hybrid grid by combination of the at least one first structured grid, the at least one second structured grid and the at least one unstructured transition grid.

2. A method as claimed in claim 1, wherein:
the at least one geometric discontinuity is a pipe or a well of known geometry crossing the reservoir, and a radial type grid is formed around each well or pipe, each cavity being defined around each second structured grid by deactivating grid cells of the at least one first structured grid.

3. A method as claimed in claim 1, wherein:
the at least one geometric discontinuity is a fracture or a fault crossing the heterogeneous reservoir and the at least one first structured grid and the at least one second structured grid are formed in parts of the heterogeneous reservoir, on either side of each fracture, by considering discontinuities thereof, each cavity including a unstructured transition grid formed by deactivating grid cells of the at least one first and second structured grids, on either side of each fracture.

4. A method as claimed in claim 2, wherein:
the at least one geometric discontinuity is a fracture or a fault crossing the heterogeneous reservoir and the at least one first structured grid and the at least one second structured grid are formed in parts of the heterogeneous reservoir, on either side of each fracture, by considering discontinuities thereof, each cavity including a unstructured transition grid formed by deactivating grid cells of the at least one first and second structured grids, on either side of each fracture.

5. A method as claimed in claim 1, comprising:
imposing polygonal edges forming of walls of each cavity to be edges of a Delaunay type triangulation.

6. A method as claimed in claim 2, comprising:
imposing polygonal edges forming the walls of each cavity to be edges of a Delaunay type triangulation.

7. A method as claimed in claim 3, comprising:
imposing polygonal edges forming the walls of each cavity to be edges of a Delaunay type triangulation.

8. A method as claimed in claim 4, comprising:
imposing polygonal edges forming the walls of each cavity to be edges of a Delaunay type triangulation.

9. A computer implemented method of simulating, in accordance with a defined numerical pattern, evolution of a process in a heterogeneous reservoir crossed by at least one geometric discontinuity of known geometry, a structure of the reservoir being known a priori from available data acquired through in-situ measurements, analyses and/or interpretations of seismic images of the reservoir, comprising:

forming at least one first structured grid for gridding of at least one part of the reservoir;

forming at least one second structured grid for gridding of another part of the reservoir comprising the discontinuity;

forming at least one cavity between the at least one first structured grid and each of the at least one second structured grid with a sufficient size to allow formation of at least one unstructured grid providing transition between the structured grids;

forming each one unstructured grid which provides transition by use of a power diagram and imposing conformity of each unstructured grid providing the transition with walls of each cavity;

generating the hybrid grid by combination of the at least one first structured grid, the at least one second structured grid and the at least one unstructured transition grid; and solving a numerical pattern in the hybrid grid formed for the medium.

10. A method as claimed in claim 1, wherein:
each first structured grid is a non-regular grid, of CPG type.

11. A method as claimed in claim 2, wherein:
each first structured grid is a non-regular grid, of CPG type.

12. A method as claimed in claim 3, wherein:
each first structured grid is a non-regular grid, of CPG type.

13. A method as claimed in claim 4, wherein:
each first structured grid is a non-regular grid, of CPG type.

14. A method as claimed in claim 5, wherein:
each first structured grid is a non-regular grid, of CPG type.

15. A method as claimed in claim 6, wherein:
each first structured grid is a non-regular grid, of CPG type.

16. A method as claimed in claim 7, wherein:
each first structured grid is a non-regular grid, of CPG type.

17. A method as claimed in claim 8, wherein:
each first structured grid is a non-regular grid, of CPG type.

18. A method as claimed in claim 9, wherein:
each first structured grid is a non-regular grid, of CPG type.

19. A method in accordance with claim 9, wherein:
the evolution of the process involves fluid flows.

20. A method in accordance with claim 10, wherein:
the evolution of the process involves fluid flows.

* * * * *